Nov. 12, 1935.  G. H. ELLIS ET AL  2,020,676
TEMPERATURE INDICATOR
Filed Feb. 8, 1933
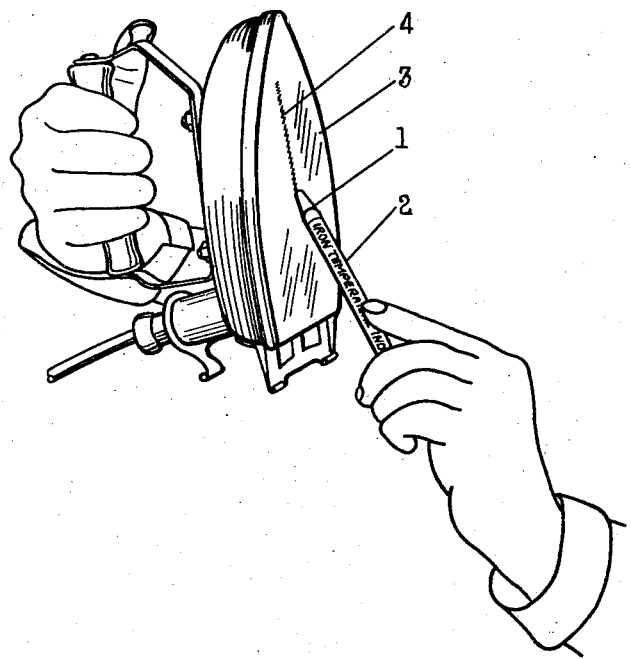
Inventors:
George H. Ellis
Alexander J. Wesson
by
Attorneys Patented Nov. 12, 1935

2,020,676

UNITED STATES PATENT OFFICE 2,020,676

TEMPERATURE INDICATOR

George Holland Ellis and Alexander James Wesson, Spondon, near Derby, England, assignors to Celanese Corporation of America, a corporation of Delaware Application February 8, 1933, Serial No. 655,857
In Great Britain February 25, 1932

9 Claims. (Cl. 73—32)

This invention relates to the control of temperature in textile and other operations and more particularly to indicators for use in the control of temperature in such operations.

In many operations involving a raised temperature, and in particular finishing operations performed on fabrics, it is important to maintain a fairly strict control over the temperature employed. This is particularly the case in such operations as ironing and calendering and especially where the materials under treatment are made of or contain yarns of a thermoplastic character, for example, yarns of cellulose acetate or other cellulose ester or ether, e. g. cellulose formate, propionate or butyrate or ethyl or benzyl cellulose, when slightly too high a temperature leads to complete destruction of the material.

The object of the present invention is to provide an indicator which may be employed to give a visual indication of temperature, e. g. the temperature of a device, for example an iron or calender employed in textile and other operations, and the invention consists in an indicator giving indications of the temperature of a surface comprising a mass of a composition containing a fusible and/or sublimable substance or mixture of substances and a filler.

In textile operations the temperature to be indicated will usually be the maximum temperature at which it is desired to conduct the operation. Preferably the fusible substance should fuse and the sublimable substance sublime freely in the neighbourhood of the temperature it is required to indicate.

On application of the indicator to a surface the temperature of which is above the melting point of the fusible substance or substances, or of their subliming point if they sublime, a visible mark is made on the surface owing to the transference of filler to the surface.

By a suitable choice of the fusible material, which may be a single substance or a mixture of substances and of the relative proportions of that material and of the filler, a wide range of indications may be obtained. For example, the indicator may be of such composition that if no mark is left on the surface showing that no melting and no transference of filler has taken place, the temperature is too low, whilst when there is a dense mark the temperature will be too high. A light or less definite mark may be taken to indicate that the correct temperature is being employed.

Preferably the materials to be employed should be such that they can be readily removed from the surface, and substances which sublime at about the working temperature of the heated surface are particularly valuable since they automatically disappear from the surface. Fillers such for example, as chalk, fuller's earth and zinc oxide and powdered pigments are easily removable from the surface by simple wiping, especially when used in conjunction with substances that sublime. Where coloured markings are desired, it is preferred to employ in admixture with the filler, such for example as chalk, fuller's earth or zinc oxide, dyestuffs which are converted to the fluid form and/or which change color at about the temperature of the heated surface at which it is desired to work. Such dyestuffs, if convertible to the fluid form, may be employed as sole fusible and/or sublimable components of the composition or in conjunction with other such components. Examples of dyestuffs which have been found suitable for use in accordance with the present invention are Lithol Fast Yellow 2G, Sudan 2G, Fast Oil Orange T, Fast Oil Scarlet 2R, Parachlororthonitroaniline and 2:6 dinitro-4-methylaniline. By a suitable choice of a volatile dyestuff it is possible to prepare an indicator which will leave a coloured mark, the colour of which is comparatively lasting, at about the working temperature, and which will leave a mark the colour of which will disappear in a few seconds if the temperature be too high.

Substances having a suitable melting point for use as indicators in the finishing of cellulose acetate materials whose thermoplastic nature necessitates considerable care in finishing operations, include for example, bismuth tribromide (M. P. 210–215° C.), metallic selenium (M. P. 217° C.), potassium pyrosulphite (M. P. 210° C.), para-azophenol (M. P. 217° C.), 1:5 dinitro-naphthalene (M. P. 210° C.), anthraquinone-disulphonic acid (M. P. 210° C.), and anthracene (M. P. 216° C.). Of these, anthracene is particularly suitable, since it has the desirable property mentioned above of subliming after melting as well as being comparatively cheap. If desired the melting point of the fusible substance may be lowered by the addition of other substances. Thus for example, naphthalene may be admixed with the anthracene to give a reduction of the melting point. The proportion of naphthalene or other substance should not be such, however, as to mask the effectiveness of the anthracene. A suitable composition containing anthracene and naphthalene has been found to consist of 10 parts of anthracene, 1–4 parts, e. g. 2 parts of naphthalene and 10–14 parts of chalk. A composition containing equal parts of anthracene and zinc oxide or precipitated chalk leaves substantially no mark on a surface having a temperature of 205° C., whilst at 210° C. slight sublimation takes place leaving a light deposit of chalk. At 220° C. a thick dense chalk mark is made on the surface, the anthracene subliming from the surface and leaving the chalk in a condition in which it is easily removed by slight rubbing with a cotton pad. The above mentioned composition containing 4 parts of naphthalene in addition to 10 parts of anthracene gives corresponding marks at a temperature about five degrees lower than those for the straight mixture of anthracene and chalk.

The composition may be made up in any suitable form, a very convenient form being that of a pencil, and may, if desired, be contained in any convenient type of holder, e. g. a metal, paper or wooden holder. The blocks, pencils, or other forms adopted for the indicator may be prepared by any convenient method. Thus, for example, equal parts of anthracene and precipitated chalk may be mixed, whilst the anthracene is in a molten condition, and the fused mass cast into moulds. Since it is desirable that the composition should be uniform throughout, the heavier brands of chalk should be avoided in such a process. It has been found very effective however, to grind the fusible material and filler, and mould them to the desired form under heat and/or pressure. It is found here also that particle size plays a large part in the production of a stick possessing the necessary strength to withstand handling. Thus large particles produce sticks of a brittle nature. A very good method of preparing the constituents has been found to be to grind them in a ball mill before moulding. The introduction of waxes, e. g. one per cent of carnauba wax, into the mixture facilitates the removal of the sticks from the mould. The moulding may be carried out by any convenient method, thus for example, materials may be moulded by ordinary pressure moulding or by the injection moulding process.

The following example illustrates the production of sticks suitable for use as temperature indicators in accordance with the present invention, but is in no way limitative:—

Example

A composition containing anthracene 15 pounds, chalk 15 pounds, and carnauba wax 4½ ozs., is ground with iron balls in a steel mill for two hours, and then passed through a 40 mesh gauge. Two pounds of the mixture is then placed in an open steam heated steel mould designed to make fifteen rods, 16 inches long, and pressed under a pressure of ½ ton per square inch, 90 pounds of steam pressure being maintained. After twenty minutes the steam is turned off and the mould cooled for two minutes with cold water. The sticks are then removed while still hot. The 16" sticks may then be cut up into convenient sizes. Such sticks applied to a hot surface leave a faint mark at 210° C. and a heavy mark at temperatures of 220° C. and over.

While the invention has been described more particularly in connection with indicators suitable for showing the temperatures of irons, calenders and other devices used in textile operations it will readily be appreciated that indicators may be made which, by suitable choice of the fusible and/or sublimable constituents, may be utilized for indicating other temperatures or ranges of temperature.

The use of the indicators of the present invention may be illustrated by the accompanying drawing. The indicator in pencil form 1 wrapped for part of its length in a stiff paper holder 2 is drawn sharply down the heated iron 3 when the heaviness of the mark 4 left by the indicator indicates whether the temperature of the iron is correct or whether it is too high.

What we claim and desire to secure by Letters Patent is:—

1. A device for giving information regarding the temperature of a surface, when brought into contact therewith, which comprises a solid mass containing a relatively infusible filling material and a substance which is converted into a fluid form at a predetermined temperature, thus permitting transfer of the filling material from the mass to a surface having at least that temperature, to form at the point of contact a visible trace capable of ready removal from the surface.

2. A device for giving information regarding the temperature of a surface, when brought into contact therewith, which comprises a solid mass containing a relatively infusible filling material and a substance which volatilizes at a predetermined temperature, thus permitting transfer of the filling material from the mass to a surface having at least that temperature, to form at the point of contact a visible trace capable of ready removal from the surface.

3. A device for giving information regarding the temperature of a surface, when brought into contact therewith, which comprises a solid mass containing a relatively infusible filling material and anthracene, which latter, by reason of its conversion into a fluid form at a definite temperature, permits transfer of the filling material from the mass to a surface having at least that temperature, to form at the point of contact a visible trace capable of ready removal from the surface.

4. A device for giving information regarding the temperature of a surface, when brought into contact therewith, which comprises a solid mass containing a relatively infusible filling material and a mixture of anthracene and naphthalene, which mixture, by reason of its conversion into a fluid form at a definite temperature, permits transfer of the filling material from the mass to a surface having at least that temperature, to form at the point of contact a visible trace capable of ready removal from the surface.

5. A device for giving information regarding the temperature of a surface, when brought into contact therewith, which comprises a solid mass containing a relatively infusible filling material, a coloring matter and a substance which is converted into a fluid form at a predetermined temperature, which substance permits transfer of the filling material and the coloring matter from the mass to a surface having at least that temperature, to form at the point of contact a visible trace capable of ready removal from the surface.

6. A device for giving information regarding the temperature of a surface, when brought into contact therewith, which comprises a solid mass containing a relatively infusible filling material, anthracene, and a coloring matter whose color changes at a temperature in excess of the melting point of anthracene, the anthracene, by reason of its conversion into a fluid form at a definite temperature, permitting transfer of the filling material and the coloring matter from the mass to a surface having at least that temperature, to 7. A device for giving information regarding the temperature of a surface, when brought into contact therewith, which comprises a solid mass containing a relatively infusible filling material, anthracene, and a coloring matter which volatilizes at a temperature in excess of the melting point of anthracene, the anthracene, by reason of its conversion into a fluid form at a definite temperature, permitting transfer of the filling material and the coloring matter from the mass to a surface having at least that temperature, to form at the point of contact a visible trace differing in appearance according to the temperature of the surface and capable of ready removal from the surface.

8. A device for giving information regarding the temperature of a surface when brought into contact therewith, which comprises a solid mass containing substantially equal proportions of chalk and anthracene, which latter, by reason of its conversion into a fluid form at a definite temperature, permits transfer of the chalk from the mass to a surface having at least that temperature, to form at the point of contact a visible trace capable of ready removal from the surface.

9. A device for giving information regarding the temperature of a surface, when brought into contact therewith, which comprises a solid mass containing equal proportions of chalk and a mixture of anthracene and naphthalene containing less than 30% of naphthalene, which mixture, by reason of its conversion into a fluid form at a definite temperature, permits transfer of the chalk from the mass to a surface having at least that temperature, to form at the point of contact a visible trace capable of ready removal from the surface.

GEORGE HOLLAND ELLIS.
ALEXANDER JAMES WESSON.